Patented Dec. 18, 1928.

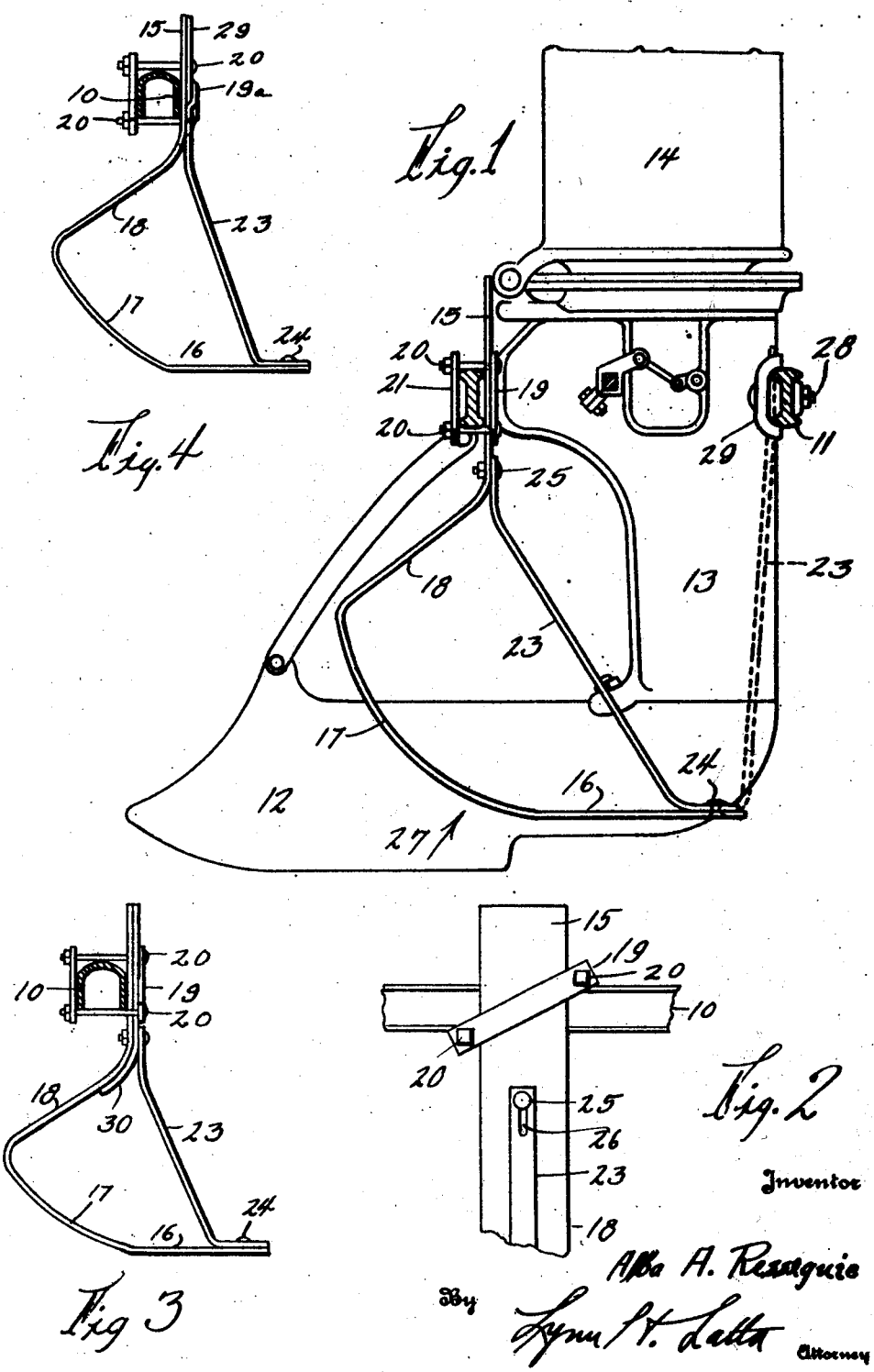

1,695,608

UNITED STATES PATENT OFFICE.

ALBA A. RESSEGUIE, OF SCHALLER, IOWA.

PLANTER DEPTH GAUGE.

Application filed August 11, 1927. Serial No. 212,286.

My invention relates to planter depth gauges and it is my object to provide a depth gauge which will not cause the planter shoe to become clogged.

Another object of my invention is to provide a depth gauge of the utmost simplicity in construction and yet which is adapted to be attached to any make or size of planter.

A further object is to provide a gauge which may be adapted to either a single or double point attachment by means of a reversible brace member.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Fig. 1 is a sectional view through a corn planter, illustrating the planting mechanism proper and my invention attached to the frame of the planter.

Fig. 2 is a rear elevation of the upper portion of the gauge, illustrating its method of attachment to the planter.

Fig. 3 shows a slightly modified form of my invention.

Fig. 4 is a view similar to Fig. 1 of a further modified form of my invention.

In my issued Patent, #1,573,327, issued Feb. 16, 1926, I have shown a planter depth gauge comprising a plate, attachable directly to the shoe of a corn planter. The proximity to the shoe, which this necessitates, I find has a tendency to cause clogging under certain conditions, the debris, which is caught between the shoe and the edge of the depth gauge, gradually becoming wedged in the crack therebetween until the accumulation interferes with the planting action of the planter.

In the present invention, I have overcome this objection by attaching the depth gauge to the frame of the planter rather than to the shoe.

Since the frame is ordinarily a considerable distance above the shoe, it is necessary to provide means for bracing the gauge in its proper position.

A primary consideration in this invention is to obtain the utmost simplicity, as has already been stated, and further to procure attachment of the gauge to the planter frame without the necessity of drilling the frame.

I find that by extending a portion of the gauge vertically across the horizontal forward frame member of the planter and clamping the engaging portion into frictional contact with the side of the frame member, that the proper rigidity of attachment may be attained in addition to the attachment without drilling the frame. A further result of such arrangement lies in the fact that the gauge may be adjusted vertically to any position by simply loosening the clamp.

In Fig. 1, I have indicated a conventional planter design, the usual horizontal forward and rear transverse frame members indicated in section at 10 and 11. The spider which connects the frame members 10 and 11 and the shoe 12 is shown at 13 and the seed hopper at 14.

The vertical portion of my gauge is indicated at 15, being formed of the same sheet of material which forms the gauge proper 16. A sheet of steel, approximately 3½ inches wide, is employed and is of the same width during its entire length.

It is desirable that the gauge extend forward beyond the forward frame member 10 and the gauge is accordingly curved upwardly as at 17 and thence extended rearwardly and upwardly to form the nose portion 18 connecting the curved portion 17 with the vertical portion 15.

The vertical portion 15 is secured to the frame member 10 by a clamp comprising a bar 19, extending diagonally across the portion 15 and a pair of bolts 20, secured by a yoke 21, extending across the forward face of the frame member 10, the vertical portion 15 of the gauge being in engagement with the rear edges of the flanges, (where the frame member is an eye beam, as shown in Fig. 1). By tightening the bolts, the vertical portion 15 may be drawn tightly against the flanges and, as it offers a wide contact face, the engagement thus attained is sufficient to rigidly position the gauge on the planter.

A brace 23 is riveted at 24 to the rear end of the horizontal portion 16 of the gauge and is extended upwardly and forwardly to the lower extremity of the vertical portion 15, where it is secured by means of a bolt 25 extended through a slot 26, (Fig. 2), in its upper end.

The brace 23, the nose portion 18, the curved runner portion 17 and the horizontal portion 16 form a closed structure, which approaches the triangular in shape and which is therefore very rigid against deformation. It may be noted further that the point of greatest pressure, exerted by the ground against the gauge in an upward direction, namely, the forward extremity of the horizontal portion 16, is very nearly directly underneath the vertical portion 15. As the planter moves forwardly, however, the pressure against the gauge will be partly vertical and partly horizontal and will result in an obliquely exerted force, somewhat as indicated by the arrow 27 in Fig. 1. The tendency of this force to move the horizontal portion 16 upwardly will be resisted by the brace 23 and the bending tendency therefore transferred to the vertical portion 15 between the upper end of the brace 23 and the horizontal frame member 10. Since this portion is very short, there will be little tendency of the gauge to spring or bow upwardly from its correct position. The gauge is made of heavy enough material so that it will not become permanently bent or broken at this point.

It may be noted that by employing a single sheet of wide material extending forwardly, as at 18, and thence bent rearwardly to form the runner portion of the gauge together with a lighter and narrower brace member 23, that the heaviest strains, namely, the bending force just mentioned, is endured by the heavier strip of metal while a lighter and cheaper piece may be employed for the member which does not receive any bending pressure but serves merely as a compression element receiving its stress entirely along its length and which is further aided by the resistance of the runner itself to being sprung. The integral construction of the attaching member, the nose 18 and the runner thus makes it possible to employ a brace which is comparatively light, gives a rigid attachment to the horizontal frame member 10, allows ready vertical adjustability of the gauge, positions the runner so that it extends forward the proper distance, and renders the cost of manufacture very low. It may be noted in this connection that by using the same strip of material of constant width, all that is necessary to form the gauge is to cut it to the proper length and then to put it in a bending die to obtain the two bends and the curve which it embodies. The rigidity of the gauge is largely due to the forwardly projecting formation, which together with the brace 23, obtains the triangular construction.

The brace 23 may be attached to the rear frame member 11 in those types of machine wherein there is contained such a rear member having a bolt 28 and, if desired, the brace 23 may be secured to this bolt by means of a suitable clamp or the like 29, the bolt being extended through the slot 26. An advantage of securing the brace in this manner lies in the fact that a portion of the strain is removed from the lower extremity of the vertical portion 15 and transferred to a direct push against the frame member 11. It may be noted that the brace 23 extends at an angle in the full line position shown, whereas in the secondary position, shown in dotted lines, it extends substantially vertically. The distance from the rivet 24 to a point spaced below the frame member 10 is thus substantially the same in a diagonal direction as the distance vertically from the rivet 24 to a point near the upper edge of the frame member 11, (which is ordinarily on a level with the frame member 10).

In reversing the brace 23 from its full line position to its dotted line position, it is simply rotated about the rivet 24.

Greater strength at the weakest point, namely that portion of the vertical portion 15 below the frame member 10, may be obtained by extending the brace 23 upwardly face to face with the vertical portion 15, as at 29 in Fig. 4. The bar 19 is then replaced by a clamp bar 19ᵃ, which is offset, as shown, so as to frictionally engage both the brace 23 and the vertical portion 15.

This same result may be obtained in another way by employing a reinforcing member 30 of equal width with the vertical member 15 and extending between the clamp 19 and the member 15.

By attaching the gauge to the frame, it may be positioned sufficiently far from the shoe 12 so that there will be no possibility of material clogging between them. The gauge is self-polishing. It can be attached to any make of corn planter since all planters employ a transverse, horizontal frame element. By attaching to the forward or the rear frame member, its position longitudinally of the planter may be changed. For planters carrying a fertilizer, a wider gauge may be employed. It may be attached to either side of the planter shoe, which is an advantage.

Some changes may be made in the construction and arrangement of the parts of my invention without departing from the real spirit and purpose of my invention, and it is my intention to cover by my claims, any modified forms of structure or use of mechanical equivalents, which may be reasonably included within their scope.

I claim as my invention:

1. A depth gauge attachment for a corn planter having a transverse, horizontal member, comprising a flat sheet of metal, bent to form a vertical portion, an integral downwardly and forwardly extending nose, and an integral downwardly and rearwardly curved runner, a clamp adapted to embrace and to urge into frictional engagement with each other, the vertical portion and said member, and a brace secured to the vertical portion just below the horizontal member, extending rearwardly and downwardly, and secured to the runner near its rear end, said brace having a slotted connection with the vertical portion.

2. A depth gauge attachment for a corn planter, having a transverse, horizontal member, including a vertical portion, a runner extended rearwardly therefrom, a clamp embracing said horizontal member and vertical portion and adapted to urge said member and said portion into frictional engagement with each other, and a brace secured to the vertical portion near the horizontal member, extending rearwardly and downwardly, and secured to the runner near its rear end, said brace being reversible about its connection with the runner so as to extend upwardly to be secured to another transverse, horizontal member of the planter which is spaced rearwardly of the first mentioned horizontal member.

3. A depth gauge attachment for a corn planter, having a transverse, horizontal member, including a vertical portion, a runner extended rearwardly therefrom, a clamp embracing said horizontal member and vertical portion and adapted to urge said member and said portion into frictional engagement with each other, and a brace secured to the vertical portion near the horizontal member, extending rearwardly and downwardly, and secured to the runner near its rear end, said brace being movable by disconnecting its upper end, to a position extending upwardly to be secured to another transverse, horizontal member of the planter which is spaced rearwardly of the first mentioned horizontal member.

4. A depth gauge attachment for a corn planter having a transverse, horizontal member, including a vertical portion, a runner extended rearwardly therefrom, a clamp embracing said horizontal member and vertical portion and adapted to urge said member and vertical portion into frictional engagement with each other, and a brace secured to the runner near its rear end by a single bolt, allowing the brace to be extended upwardly and forwardly to be secured to the vertical portion near the horizontal member or to be extended upwardly and rearwardly to be secured to an intermediate frame member of the planter.

Signed this 2nd day of August, 1927, in the county of Woodbury and State of Iowa.

ALBA A. RESSEGUIE.